United States Patent Office 3,236,910
Patented Feb. 22, 1966

3,236,910
DEHYDROGENATION PROCESS EMPLOYING A CHROMIUM CONTAINING ZEOLITE
Stanley W. Bukata, Buffalo, N.Y., Charles R. Castor, Homewood, Ill., and Robert M. Milton, Buffalo, N.Y., assignors to Union Carbide Corporation, a corporation of New York
No Drawing. Filed Dec. 18, 1961, Ser. No. 160,318
4 Claims. (Cl. 260—683.3)

This application is a continuation-in-part of Serial No. 762,960, filed September 24, 1958, now U.S. Patent No. 3,013,988.

This invention relates to a hydrocarbon conversion process. More particularly, this invention relates to a process for the dehydrogenation of hydrocarbons using chromium supported zeolitic molecular sieves.

Chromium oxide ($Cr_2O_3$) supported on gamma alumina is a very important dehydrogenation catalyst for hydrocarbons such as butane and propane. The oxide is an important polymerization catalyst for ethylene or propylene with or without a support. The gamma alumina supported oxide is extremely valuable as a gasoline reforming catalyst. In addition to these uses chromium oxides are useful promoters for many other catalysts.

It would be desirable to provide these catalysts having a very high catalytic surface wherein the catalytic material is an integral part of the support material.

It is an object of the present invention to provide a new process for the dehydrogenation of hydrocarbons using chromium supported on a zeolitic molecular sieve.

Other objects will be apparent from the subsequent disclosure and appended claims.

The objects of this invention are accomplished by contacting hydrocarbons to be dehydrogenated with a chromium supported zeolitic molecular sieve under dehydrogenating conditions.

Zeolitic molecular sieves, both natural and synthetic, are metal aluminosilicates. The crystalline structure of these materials is such that a relatively large adsorption area is present inside each crystal. Access to this area may be had by way of openings or pores in the crystal. Molecules are selectively adsorbed by molecular sieves on the basis of their size and polarity among other things.

Zeolitic molecular sieves consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example, metal ions, ammonium ions, amine complexes, or hydrogen ions. The spaces between the tetrahedra may be occupied by water or other adsorbate molecules.

The zeolites may be activated by driving off substantially all of the water of hydration. The space remaining in the crystals after activation is available for adsorption of adsorbate molecules. Any of this space not occupied by elemental metal is available for adsorption of molecules having a size, shape, and energy which permits entry of the adsorbate molecules into the pores of the molecular sieves.

The zeolitic molecular sieves, to be useful in the present invention, must be capable of adsorbing benzene molecules under normal conditions of temperature and pressure. Included among these molecular sieves, and preferred for the purposes of the present invention, are the natural zeolite faujasite and synthetic zeolites X, Y and L. The natural material is adequately described in the chemical art. The characteristics of the aforementioned synthetic materials, and the processes for making them, are provided below.

The general formula for zeolite X, expressed in terms of mol fractions of oxides, is as follows:

$$0.9 \pm 0.2 M_{2/n}O : Al_2O_3 : 2.5 \pm 0.5 SiO_2 : 0 \text{ to } 8H_2O$$

In the formula "M" represents a cation, for example hydrogen or a metal, and "$n$" its valence. The zeolite is activated or made capable of adsorbing certain molecules by the removal of water from the crystal as by heating. Thus the actual number of mols of water present in the crystal will depend upon the degree of dehydration or activation of the crystal. Heating to temperatures of about 350° C. has been found sufficient to remove substantially all of the adsorbed water.

The cation represented by the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is $$0.9 Na_2O : Al_2O_3 : 2.5 SiO_2 : 6.1 H_2O$$

The major lines in the X-ray diffraction pattern of zeolite X are set forth in Table A below:

Table A

| $d$ value of reflection in A.: | 100 $I/I_o$ |
|---|---|
| 14.42 ± 0.2 | 100 |
| 8.82 ± 0.1 | 18 |
| 4.41 ± 0.05 | 9 |
| 3.80 ± 0.05 | 21 |
| 3.33 ± 0.05 | 18 |
| 2.88 ± 0.05 | 19 |
| 2.79 ± 0.05 | 8 |
| 2.66 ± 0.05 | 8 |

In obtaining the X-ray diffraction powder patterns, standard techniques were employed. The radiation was the KoC doublet of copper, and a Geiger counter spectrometer with a strip chart pen recorder was used. The peak heights, I, and the positions as a function of 2θ, where θ is the Bragg angle, were read from the spectrometer charge. From these, the relative intensities $$\frac{100 \, I}{I_o}$$

where $I_o$ is the intensity of the strongest line or peak, and $d(obs)$ the interplanar spacing in A., corresponding to the recorded lines were calculated. The X-ray patterns indicate a cubic unit cell of dimensions between 24.5 A. and 25.5 A.

To make sodium zeolite X, reactants are mixed in aqueous solution and held at about 100° C. until the crystals of zeolite are formed. Preferably the reactants should be such that in the solution the following ratios prevail:

| $SiO_2/Al_2O_3$ | 3–5 |
|---|---|
| $Na_2O/SiO_2$ | 1.2–1.5 |
| $H_2O/Na_2O$ | 35–60 |

The chemical formula for zeolite Y expressed in terms of oxides mole ratios may be written as $$0.9 \pm 0.2 \, Na_2O : Al_2O_3 : WSiO_2 : XH_2O$$

wherein "W" is a value greater than 3 up to about 5 and "X" may be a value up to about 9.

Zeolite Y has a characteristic X-ray powder diffraction pattern which may be employed to identify zeolite Y. The X-ray powder diffraction data are shown in Table B. The values for the interplanar spacing, $d$, are expressed in angstrom units. The relative intensity of the lines of the X-ray powder diffraction data are expressed as VS, very strong; S, strong; M, medium; W, weak; and VW, very weak.

Table B

| hkl | $h^2+k^2+l^2$ | d in A. | Intensity |
| --- | --- | --- | --- |
| 111 | 3 | 14.3–14.4 | VS. |
| 220 | 8 | 8.73–8.80 | M. |
| 311 | 11 | 7.45–7.50 | M. |
| 331 | 19 | 5.67–5.71 | S. |
| 333, 511 | 27 | 4.75–5.08 | M. |
| 440 | 32 | 4.37–4.79 | M. |
| 620 | 40 | 3.90–4.46 | W. |
| 533 | 43 | 3.77–3.93 | S. |
| 444 | 48 | 3.57–3.79 | VW. |
| 551, 711 | 51 | 3.46–3.48 | VW. |
| 642 | 56 | 3.30–3.33 | S. |
| 553, 731 | 59 | 3.22–3.24 | W. |
| 733 | 67 | 3.02–3.04 | M. |
| 660, 822 | 72 | 2.91–2.93 | M. |
| 555, 751 | 75 | 2.85–2.87 | S. |
| 840 | 80 | 2.76–2.78 | M. |
| 753, 911 | 83 | 2.71–2.73 | W. |
| 664 | 88 | 2.63–2.65 | M. |
| 931 | 91 | 2.59–2.61 | M. |
| 844 | 96 | 2.52–2.54 | VW. |
| 862; 10, 2, 0 | 104 | 2.42–2.44 | VW. |
| 666; 10, 2, 2 | 108 | 2.38–2.39 | M. |
| 775; 11, 1, 1 | 123 | 2.22–2.24 | VW. |
| 880 | 128 | 2.18–2.20 | W. |
| 955; 971; 11, 3, 1 | 131 | 2.16–2.18 | VW. |
| 973; 11, 3, 3 | 139 | 2.10–2.11 | W. |
| 884; 12, 0, 0 | 144 | 2.06–2.07 | VW. |
| 886; 10, 8, 0; 12, 4, 2 | 164 | 1.93–1.94 | VW. |
| 10, 8, 2 | 168 | 1.91–1.92 | VW. |
| 995; 13, 3, 3 | 187 | 1.81–1.82 | VW. |
| 11, 7, 5; 13, 5, 1 | 195 | 1.77–1.78 | VW. |
| 10, 8, 6; 10, 10, 0; 14, 2, 0 | 200 | 1.75–1.78 | W. |
| 997; 11, 9, 3 | 211 | 1.70–1.71 | W. |

When an aqueous colloidal silica sol employed as the major source of silica, zeolite Y may be prepared by preparing an aqueous sodium aluminosilicate mixture having a composition, expressed in terms of oxide-mole-ratios, which falls within one of the following ranges:

| | Range 1 | Range 2 | Range 3 |
| --- | --- | --- | --- |
| $Na_2O/SiO_2$ | 0.20 to 0.40 | 0.41 to 0.61 | 0.61 to 0.80 |
| $SiO_2/Al_2O_3$ | 10 to 40 | 10 to 30 | 7 to 30 |
| $H_2O/Na_2O$ | 25 to 60 | 20 to 60 | 20 to 60 | maintaining the mixture at a temperature of about 100° C. until crystals are formed, and separating the crystals from the mother liquor.

When sodium silicate is employed as the major source of silica, zeolite Y may be prepared by preparing an aqueous sodium aluminosilicate mixture having a composition, expressed in terms of oxide-mole-ratios, falling within one of the following ranges:

| | Range 1 | Range 2 | Range 3 |
| --- | --- | --- | --- |
| $Na_2O/SiO_2$ | 0.6 to 1.0 | 1.5 to 1.7 | 1.9 to 2.1 |
| $SiO_2/Al_2O_3$ | 8 to 30 | 10 to 30 | about 10 |
| $H_2O/Na_2O$ | 12 to 90 | 20 to 90 | 40 to 90 | maintaining the mixture at a temperature of about 100° C. until crystals are formed, and separating the crystals from the mother liquor.

The composition of zeolite L, expressed in terms of mol ratios of oxides, may be represented as follows:

$$1.0 \pm 0.1 M_{2/n}O : Al_2O_3 : 6.4 \pm 0.5\ SiO_2 : y\ H_2O$$

wherein "M" designates a cation, "n" represents the valence of "M"; and "y" may be any value from 0 to about 7.

The more significant d(A.) values, i.e., interplanar spacings, for the major lines in the X-ray diffraction pattern of zeolite L, are given below in Table C.

Table C

| | |
| --- | --- |
| 16.1±0.3 | 3.17±0.01 |
| 7.52±0.04 | 3.07±0.01 |
| 6.00±0.02 | 2.91±0.01 |
| 4.57±0.03 | 2.65±0.01 |
| 4.35±0.04 | 2.46±0.01 |
| 3.91±0.02 | 2.42±0.01 |
| 3.47±0.02 | 2.19±0.01 |
| 3.48±0.02 | |

Although there are a number of cations that may be present in zeolite L, it is preferred to synthesize the potassium and potassium-sodium forms of the zeolite, i.e., the form in which the exchangeable cations present are substantially all potassium or potassium and sodium ions. The reactants accordingly employed are readily available and generally water soluble. The exchangeable cations present in the zeolite may then conveniently be replaced by other exchangeable cations.

The potassium or potassium-sodium forms of zeolite L may be prepared by preparing an aqueous metal aluminosilicate mixture having a composition, expressed in terms of mole ratios of oxides falling within the following range:

$K_2O/(K_2O+Na_2O)$ _____ from about 0.33 to about 1
$(K_2O+Na_2O)/SiO_2$ _____ from about 0.4 to about 0.5
$SiO_2/Al_2O_3$ _____ from about 15 to about 28
$H_2O/(K_2O+Na_2O)$ _____ from about 15 to about 41 maintaining the mixture at a temperature of about 100° C. until crystallization occurs, and separating the crystals from the mother liquor.

One method available for preparing the chromium metal-containing zeolitic molecular sieves comprises treating the molecular sieves with an aqueous solution containing complex water-soluble chromium-amine cations, both organic and inorganic. These complex cations ion-exchange with the cations normally present in the zeolite. The exchanged zeolite is then removed from the solution, dried and activated, for example, by heating the molecular sieve up to a temperature of about 350° C. in a flowing stream of inert dry gas or vacuum. The activation should be effected at a temperature below the temperature at which the complex cations are destroyed. The activated molecular sieve may then be subjected to heat treatment to a temperature not exceeding about 650° C. and preferably not exceeding about 500° C. in vacuum or inert atmosphere whereby the complex cation is destroyed and the metal is reduced in the molecular sieve. Should the thermal treatment be insufficient to reduce the complex cations to the metallic state chemical reduction either alone or in combination with thermal reduction may be employed. Alkali metals such as sodium are suitable reducing agents for this purpose. Throughout the operation excessive temperatures and extremes of acidity are to be avoided since they may tend to destroy the crystal structure of the zeolitic molecular sieve.

To illustrate this method of preparation, tris(ethylenediamine) chromium (III) sulfate was prepared according to the method found in the reference, Fernelius, W. C., Inorganic Syntheses, vol. II, 198 (1946). Five grams of hydrated sodium zeolite X powder was stirred with 50 milliliters of 0.5 M aqueous solution of tris(ethylene diamine) chromium (III) sulfate for one hour. The suspension was filtered and washed first with distilled water, then alcohol, and finally ether. It was dried in air. Some of the sodium cations had been replaced by a complex cation containing chromium. Five grams of this ion-exchanged product were heated to 350° C. for two hours to decompose the complex ion and remove the amine. The temperature was then reduced to 170° C. and 5 grams of molten metallic sodium were slowly added under a stream of argon. The chromium was reduced by the sodium whereupon the chromium cation was replaced by sodium cations in the structure of the molecular sieve and the chromium was deposited within the molecular sieve. The product was black and contained 9 weight-percent chromium by chemical analysis. Upon exposure to air the product turned brown indicating the oxidation of the chromium.

Still another process which is suitable for the preparation of the catalyst comprises intimately contacting an activated zeolitic molecular sieve (activated by any of the methods described previously) in an inert atmosphere with a fluid decomposable compound of chromium whereby the decomposable compound is adsorbed by the zeolitic molecular sieve in its inner adsorption region. The adsorbed decomposable compound is then reduced in situ to provide a metal having a high specific surface of corresponding high chemical and catalytic activity.

Adsorbable compounds which are suitable for introducing the metal into the molecular sieve are carbonyl and carbonyl hydrides. The reduction of the compound may be either chemical or thermal. In the case of chemical reduction the reducing agent may be deposited first in the inner adsorption area and the reducible compound introduced subsequently or alternatively the reducible compound may be sorbed into the inner adsorption area and the reducing agent introduced subsequently.

To illustrate this method of preparation, ten grams of sodium zeolite Y powder ($SiO_2/Al_2O_3=4.4$), which had been activated by heating at 350° C. to drive off the intracrystalline water, was mixed with 2 grams of bis-toluene chromium, and heated in a closed tube at 95° C. for two hours. This resulted in adsorption of the chromium compound into the pore system of the molecular sieve zeolite. This was then heated to 375° C. in a flowing stream of argon gas causing decomposition of the bis-toluene chromium and deposition of chromium metal within the zeolite. Analysis showed 4.9 weight-percent chromium was deposited in the zeolite.

A glass tube was charged with 15 grams of activated sodium zeolite X pellets and 4 grams of chromium hexacarbonyl in separate zones with glass wool plugs between and outside the zones. The tube was heated to 100° C. in an electric furnace while a flow of argon was maintained through the tube from the chromium carbonyl zone through the zeolite zone. These conditions were maintained for several hours following which the temperature was raised to 375° C. to decompose the adsorbed chromium carbonyl yielding elemental chromium deposited with the sodium zeolite X. Upon exposure to air the active chromium oxidized with considerable heat being developed.

As was stated previously, in the utilization of chromium metals for catalytic purposes, they have also been supported by alumina, silica, mixtures thereof and aluminosilicates. When contained in the inner adsorption area of molecular sieves, the metals provide superior catalysts because the metal is contained in the finest possible distribution in a highly active form. Molecular sieves have a higher surface area than any of the other catalyst supports. The uniform structure of the molecular sieves provides uniform activity throughout the catalytic surface. Further certain properties characteristic of zeolitic molecular sieves still further enhance the use of the metal-loaded products. For example, by properly selecting the pore size and the crystal structure by proper selection of molecular sieves it is possible to obtain the most favorable conditions for a given reaction even to the point of carrying on reactions in the presence of other materials which would normally interfere with the reaction. The selectivity of the various molecular sieves will in any case exclude the interfering catalysts from the catalytic surface while in no way preventing the desired materials from contacting this surface. Further the chemical and catalytic nature of the molecular sieve itself may be altered to suit the requirements of the reactants by the selection of the most suitable cation present in the molecular sieve structure.

The metal-loaded molecular sieves may be employed to prepare the oxide catalysts by simple oxidation of the metals to the corresponding oxides. This may be accomplished by merely exposing the metal-loaded molecular sieves to air in many cases. More satisfactory results will be obtained, however, by exposing the molecular sieves to oxygen at elevated temperatures. These metal oxide-bearing molecular sieves may then be employed for catalysis in the reactions described previously. All of the advantages which accrue from the utilization of molecular sieves loaded with catalytic metals are obtained by using metal oxide-loaded molecular sieves in appropriate catalytic reactions.

To illustrate the preparation of the chromium oxide-containing zeolitic molecular sieve 256 grams of hydrated zeolite X containing 27.6 weight-percent of water were suspended in 600 milliliters of water. A liter of water containing dissolved therein 25.6 grams of chromic chloride, $Cr[(H_2O)_4Cl_2]Cl \cdot H_2O$, was added to the suspension. The mixture was stirred for ten minutes and the molecular sieve was removed by suction filtration, washed and dried at 125° C. Approximately 23 percent of the sodium cations were exchanged for complex chromium cations; the chromium content of the molecular sieve at this point was 1.95 weight-percent. A 104 gram portion of the dried material was mixed with 38 grams of binding clay and the mixture was made into 8×10 mesh pellets which were then fired at 550° C. in a nitrogen purge for eight hours. The chromium was decomposed from the complex cation to the oxidized form during the firing step.

In an example of the present invention, the chromium oxide-containing molecular sieve prepared above was employed for the dehydrogenation of propane by preparing a reaction tube consisting of ½-inch diameter by 50 centimeters long quartz tube. The catalyst bed was approximately 20 centimeters long and was preceded by 10 centimeters of packed, quartz chips. Dried propane gas was passed through the heated catalyst at a space velocity of 1000 cubic centimeters per cubic centimeter of catalyst per hour, first at 600° C. and then at 650° C. The effluent gas was cooled by means of an ice-water bath. The cooled effluent was then passed into a solution of bromine dissolved in carbon tetrachloride. The extent of conversion of the propane to propylene was then calculated from the known amount of propane passed over the catalyst and the amount of bromine consumed per unit time. At 600° C. a 5 percent conversion was obtained and at 650° C. a 9 percent conversion was obtained. In each case the tests were run for three hours. No liquid product was obtained in either test thereby indicating that there were no apparent side reactions or polymerizations.

The catalyst of the above example contains active metal in a particularly effective form. In the preparation of the catalyst, the chromium was introduced by complex cation exchange, the cation being monovalent and containing therein the metal in its trivalent state. It is evident that in the ion-exchange, each mole of cation introduced replaces one mole equivalent of the exchangeable cation of the zeolitic molecular sieve and upon destruction of the cationic complex the chromium with its three positive valencies is in a higher state of oxidation than is normally required to fulfill its function as the cation.

As used herein the term "activation" is employed to designate the removal of water from the zeolitic molecular sieves, i.e., dehydration, and not refer to catalytic activity. The zeolitic molecular sieves containing the elemental metal and/or metal oxides exhibit catalytic activity.

The catalyst used in the process of the present invention has a surface area about four times that expected with most alumina, silica or aluminosilicate supported metals thereby providing a greater surface area available for reaction. Since the external surface of the molecular sieve represents less than 1 percent of the total surface area it may be seen that there is an extremely large area available for chemisorption and catalysis in the internal portion of the molecular sieve. Since this region is available only through pores of molecular size it may be seen that selective chemisorption and catalysis may be obtained in a system containing a mixture of molecules some of which are too large to enter the pores whereas others are capable of entering the pores.

The preferred catalysts for the process of the present invention which have been found to be most satisfactory and useful for catalytic purposes are the metal-loaded zeolites X, Y, and faujasite.

What is claimed is:

1. A process for the dehydrogenation of hydrocarbons which comprises contacting said hydrocarbons with a crystalline zeolitic molecular sieve containing a member selected from the group consisting of elemental chromium and chromium oxide in the inner adsorption region, said sieve being characterized as being capable of adsorbing benzene, under dehydrogenating conditions.

2. A process as described in claim 1 wherein the zeolites are selected from the group consisting of zeolites X, Y, L and faujasite.

3. A process according to claim 1 in which said crystalline zeolitic molecular sieve contains chromium oxide in the inner adsorption region.

4. A process for the dehydrogenation of hydrocarbons which comprises providing a crystalline zeolitic molecular sieve capable of adsorbing benzene, heating said molecular sieve with an aqueous solution containing a complex water-soluble chromium-amine cation thereby ion-exchanging the complex cation with the structural cations of the molecular sieve; removing the complex cation-exchanged molecular sieve from the solution; heating the sieve to a temperature below about 650° C. to activate same and decompose the complex cation thereby depositing elemental chromium in the inner adsorption region of the molecular sieve; thereafter contacting said hydrocarbons with the chromium-containing crystalline molecular sieve under dehydrogenating conditions.

References Cited by the Examiner

UNITED STATES PATENTS

| | | | |
|---|---|---|---|
| 2,970,968 | 2/1961 | Riordan et al. | 252—455 |
| 2,971,903 | 2/1961 | Kimberlin et al. | 208—119 |
| 2,971,904 | 2/1961 | Gladrow et al. | 252—455 |
| 3,013,988 | 12/1961 | Bukata et al. | 252—455 |
| 3,140,322 | 7/1964 | Frilette et al. | 260—667 |

FOREIGN PATENTS 519,808 4/1940 Great Britain.

OTHER REFERENCES

"A Test-book of Inorganic Chemistry," by J Newton Friend, published by Charles Griffin and Company, Ltd., 1920, pages 197 and 289.

DELBERT E. GANTZ, *Primary Examiner.*

ALPHONSO D. SULLIVAN, JOSEPH R. LIBERMAN,
*Examiners.*